Nov. 12, 1968   J. M. JAMISON   3,409,983
PRUNING DEVICE
Filed Oct. 22, 1965   2 Sheets-Sheet 1
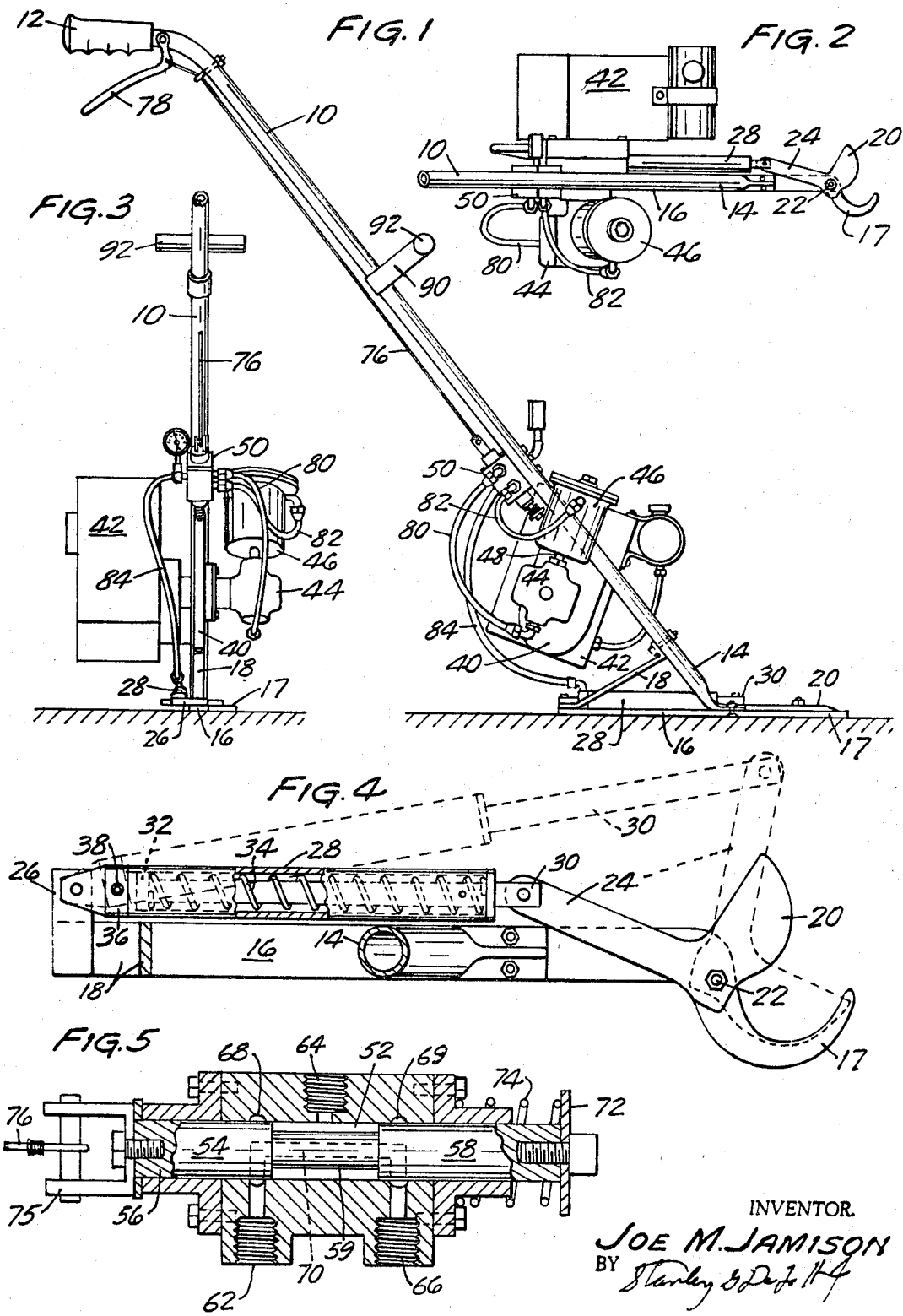
INVENTOR.
JOE M. JAMISON
BY
ATTORNEY

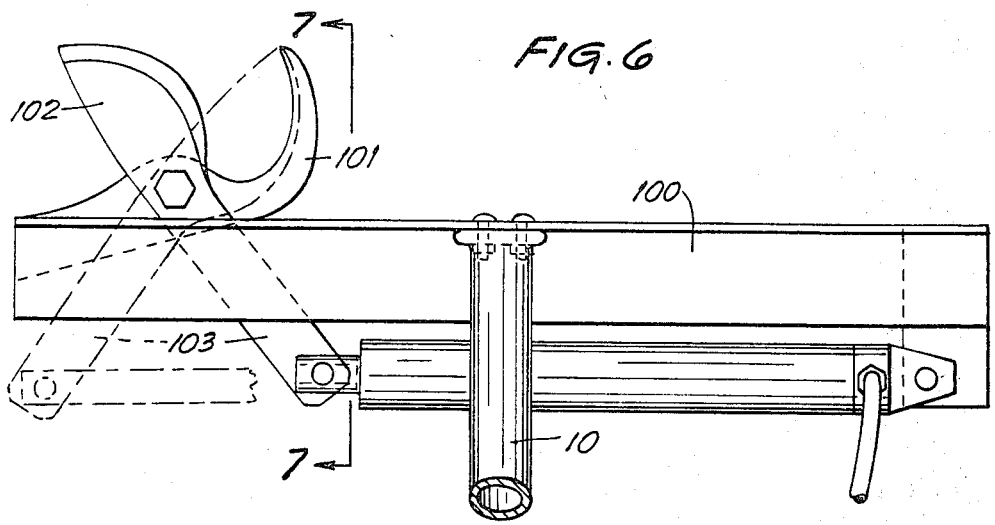
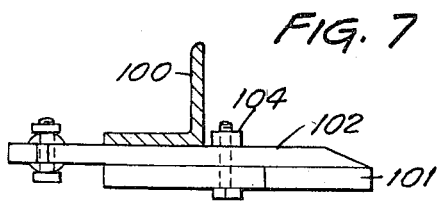
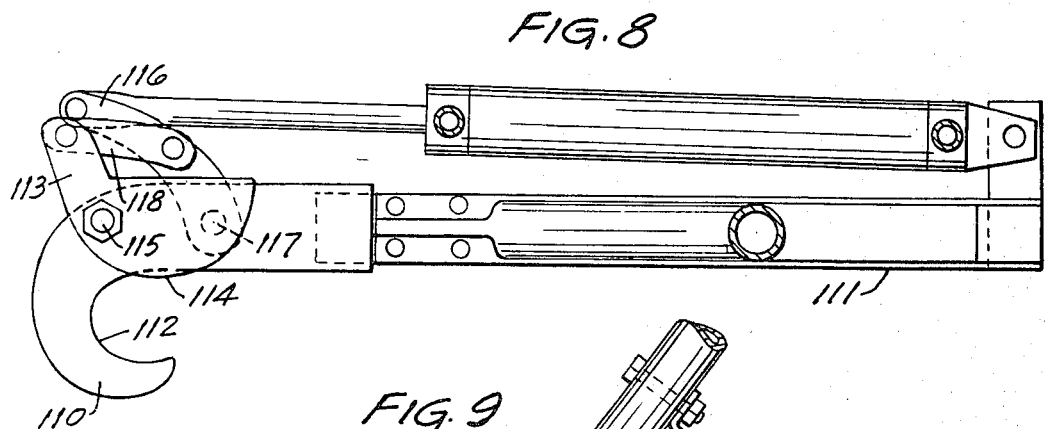
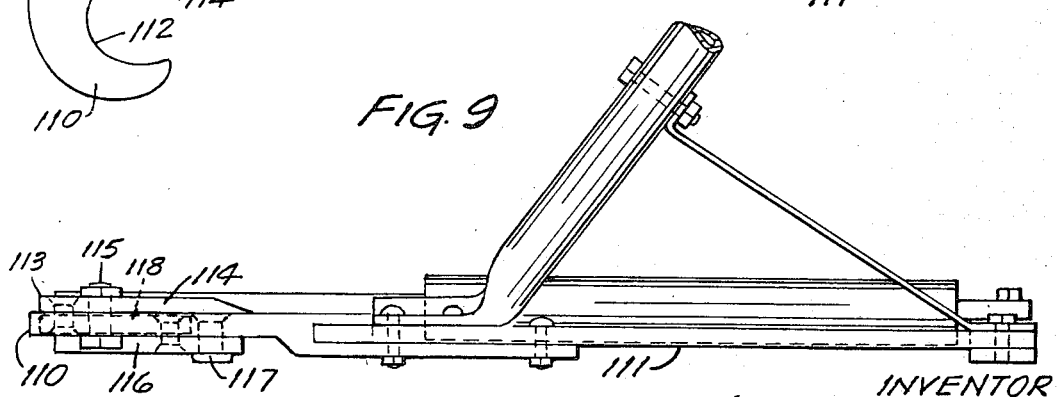

United States Patent Office 3,409,983
Patented Nov. 12, 1968

3,409,983
PRUNING DEVICE
Joe M. Jamison, Webster, Wis. 54893
Filed Oct. 22, 1965, Ser. No. 501,928
3 Claims. (Cl. 30—228)

ABSTRACT OF THE DISCLOSURE

The present invention concerns a self-contained foliage pruning device containing a cutting assembly and a self-contained engine-hydraulic pump unit connected therewith. The cutting assembly includes a fixed shear blade and a mating pivotal shear blade which are opened and closed through the action of a hydraulic cylinder and piston assembly. The engine-hydraulic pump unit comprises a self-powered engine, e.g., of the internal combustion type, connected to a hydraulic pump, the pump in turn being connected through hydraulic hoses to the hydraulic cylinder through an actuating valve. In the inactive position the valve allows the hydraulic fluid to recycle through the pump, and in the actuated position diverts the fluid to the hydraulic cylinder to close the pivotal cutting blade.

---

The present invention relates generally to pruning or trimming devices for clearing foliage, branches, small trees, etc., and especially concerns such devices which are completely self-contained, requiring no fluid or power source other than that carried by the operator of the device.

In the past several decades, numerous patents have issued directed to trimming or pruning tools of one type or another. Several have found their way into commercial usage; for example, see Miller Patents Nos. 2,612,140, granted Sept. 30, 1952; 2,709,446, granted May 31, 1955; 2,743,703, granted May 1, 1956; 2,751,922, granted June 26, 1956; and 2,751,940, granted June 26, 1956.

Each of the devices disclosed in the Miller patents depends on heavy, cumbersome air compressors to actuate the tool, necessitating a flexible connecting line or lines between the compressor and the tool. This, of course, has the disadvantage of limiting the operative range of the tool for one position of the compressor, as well as the inconvenience of possible entanglement of the connecting pressure hose.

Other patents which have been concerned in one way or another with pruning tools or shears include Gerrand Patent No. 2,814,872, granted Dec. 3, 1957, disclosing hydraulic powered equipment; Johnson Patent No. 2,600,540 granted June 17, 1952, in which a hydraulic fluid constituting a disinfectant both operates the cutting blades and serves to disinfect the same; and Grieder Patent No. 2,629,220, granted Feb. 24, 1953, disclosing an electrically powered pruning shears.

In addition to requiring external power sources, prior art devices employing fluid pressure-operated cylinder-piston means for opening and closing the cutting blades usually have the piston and piston rod assembly fixedly positioned, whereby the direction of forces on the cutting blades are (at least at times) at an angle, i.e. not axially aligned with the direction of travel of the piston. In these devices, precaution must be taken to eliminate bending or binding of the piston rod and moving parts in actuating the cutting blades.

While the power appliance arts have advanced greatly in recent years, and emphasis has been placed on the provision of powered pruning and foliage trimming tools, no one, insofar as I am aware, has previously provided a simply operated, portable pruning or trimming tool which is completely self-contained, so as to be carried with and manipulated by the operator. The present invention is directed to the provision of such a device.

The manner in which these and other objectives of my invention are attained will be apparent from the description which follows, including the appended drawing, wherein like reference characters refer to corresponding parts in the several views, and in which:

FIGURE 1 is a side view of a preferred embodiment of my self-contained clipping or pruning device;

FIGURE 2 is a top or plan view of the device of FIGURE 1, omitting the upper portion of the handle and trigger mechanism;

FIGURE 3 is a rear view of the device of FIGURE 1;

FIGURE 4 is an enlarged view, partially cut away, of the cutting assembly;

FIGURE 5 is a view, partially in section and somewhat schematic in character, showing the valve assembly;

FIGURE 6 is a plan or top view of an alternative cutting assembly;

FIGURE 7 is a section view taken along the lines 7—7 of FIGURE 6;

FIGURE 8 is a plan or top view of another cutting assembly, illustrating a different cutting blade mechanism; and FIGURE 9 is a side view of the cutting assembly FIGURE 8.

Referring now to FIGURES 1 through 5, inclusive, an elongate tubular support frame bar 10, diagonally disposed when the device is in operative position, is curved at the upper end and terminates in a horizontal handle 12. At its lower end 14, the frame 10 is flattened and bent horizontally where it is fastened to sole plate 16 which extends generally horizontally when the device is in operative position. In the embodiment under description, the sole plate juts forwardly of the frame 10, terminating in a hooked stationary shear blade 17 (FIG. 4), and rearwardly of the point of connection to the frame where brace 18, connected between the plate and frame, rigidifies the mounting.

Mating with the stationary shear blade 17 is a movable shear blade 20, pivotally fastened to the sole plate about axis 22. Fixed to the movable blade, and extending at an angle in respect to the sole plate 16 when the blades are in closed position (shown in broken lines), is lever 24. When the movable blade is in the open position, lever 24 extends rearwardly, the end thereof being positioned to the side of the sole plate 16 and frame 10.

The shapes of the stationary hooked blade 17 and movable mating blade 20 preferably are such that when the blades are in the open position, a limb, branch or small tree trunk can be hooked therebetween and sheared off as the blade 20 closes with respect to fixed blade 17. Note that if blade 17 were not hook-shaped at the end thereof, a limb or branch might be pushed from the blades as blade 20 closes, instead of being sheared off.

At the rear end thereof, sole plate 16 is provided with a lateral extension 26. A hydraulic cylinder-piston assembly is mounted for movement between said extension and lever 24, the cylinder 28 being pivotally mounted to extension 26 and piston rod 30 likewise being pivotally connected to lever 24.

Piston 32, to which the inner end of piston rod 30 is affixed, is urged to a rearward position by return spring 34, which bears against the forward end wall of the cylinder 28 and the piston 32, thus normally retaining the blade 20 in the open position.

A fluid chamber 36 of variable size depending upon the position of piston 32 is defined within the cylinder rearwardly of the piston. A port 38 allows hydraulic fluid to pass into and from said chamber. In a preferred embodiment, the cylinder 28 has a one-inch bore and the piston a four-inch stroke.

It will be seen that as hydraulic fluid is forced under high pressures into chamber 36 through port 38, piston 32 advances, pushing piston rod 30 out of the cylinder, whereby lever 24 pivots to close blade 20 scissors-like on blade 17. As this occurs, the cylinder and piston rod pivot about the connection to rearward extension 26, away from sole plate 16, until, when the blade is closed, the piston, cylinder and blades assume the position shown in the broken lines in FIGURE 4.

By this pivotal mounting assembly, a straight axial force is exerted by and on the cylinder-piston rod assembly; lateral forces tending to bend the rod or bind moving parts are minimal.

A self-contained hydraulic fluid pressure-supply and valve system is mounted on the frame 10 by which the cutting blades are controlled and actuated. Thus, a bearing plate 40 is affixed to and depends downwardly from frame 10. Mounted on one side of the bearing plate, is a small gasoline engine and gear reduction unit, generally indicated as 42. The engine conveniently may be a one horsepower two-cycle gasoline-powered internal combustion engine, for example a "Compact III," Model E, engine marketed by Ohlsson & Rice, Inc., weighing slightly less than four pounds, and having a 1.250 inch bore, a 1.09 inch stroke, a 1.34 cubic inch cylinder, and a 9:1 compression ratio, and a gear ration of 3.666:1. The drive gear of the engine-gear reduction unit 42 is provided with a splined hub, into which extends the horizontal knurled mating shaft of hydraulic pump 44, said pump being mounted on the opposite side of mounting plate 40, with the shaft extending therethrough. Disposed above said pump is a hydraulic reservoir 46, interconnected with the upper (suction) side of the pump, through a short pipe nipple 48, and by which the reservoir is held in place.

Also mounted on frame 10, slightly above the mounting plate 40 and the reservoir 46, is a hydraulic valve 50 described particularly in FIGURE 5. Said valve comprises body 52 centrally bored, within which is slidably disposed valve piston 54. The diameter of the valve piston, at its forward end 56 and at its rearward end 58, is substantially that of the bore in body 52. The intermediate portion 59 of valve piston 54 is of reduced diameter, thereby defining a chamber 60 between the exterior of said mid-portion and the wall of body 52.

The body 52 is provided with an inlet port 62, an outlet port 64, and an exhaust port 66, positioned as shown, each communicating with the interior bore in the body 52. Actually, at the point where each of inlet port 62 and exhaust port 66 enter the interior of body 52, the inner wall thereof is recessed annularly at 68 and 69, respectively, about valve piston 54. The valve piston is further provided with an internal bypass 70, which opens into annular recesses 68 and 69, when the valve is in its normal forward position.

The annular recesses 68 and 69, and the internal bypass 70 combine several functions. The recesses allow hydraulic fluid under pressure to surround the piston 54 in its normal forward position, thus to allow hydraulic fluid to enter the bypass whether the piston happens to be so positioned radially so that the bypass is disposed opposite the inlet port, or whether the piston is rotated to a different position. Also, by surrounding the valve piston the fluid exerts uniform centripetal force on the valve piston 54, thereby reducing lateral frictional forces thereon (hampering operation of the valve), such as would exist in absence of the recesses.

The forward end of valve piston 54 terminates in a flange 72, a coil spring 74 being interposed between said flange and the body 52 to urge valve piston 54 to the normal forward position shown. At its opposite end, the valve stem is provided with a clevis 75, to which is attached tension wire 76. At its opposite end said tension wire is fastened to trigger 78 (FIG. 1) so that, upon squeezing the trigger 78, wire 76, under tension, pulls valve piston 54 to a rearward position against the force of spring 74.

In its rearward position, inlet port 62 opens into chamber 60, while exhaust port 66 is blocked by enlarged end portion 56. Internal passage 70 is likewise blocked off.

The valve body 52 is appropriately fitted with O-rings (not shown) which extend about piston 54 and which are positioned, for example, to flank recess 68, and recess 69, to seal the valve against leakage.

High pressure tubing 80 connects the lower or discharge side of pump 44 to the inlet port 62, and similarly high pressure tubing 82 connects the exhaust port 66 with reservoir 46. Flexible high pressure tubing 84 connects the outlet port 64 with the port 38 of cylinder 28 of the drive assembly. A pressure gauge interposed in tubing 84 indicates fluid pressure during the interval when the valve is actuated.

Toward the center of frame 10 is fastened a bracket 90 extending upwardly and generally perpendicular with respect to the frame, at the top of which is mounted a horizontal handle 92. The bracket 90 and handle 92 are so positioned along the length of frame 10 that when one hand of the operator grasps handle 12 and the other hand grasps handle 22, the operator will be in a comfortable, as opposed to an uncomfortable, stooped-over position, and can readily lift and maneuver my device.

My novel device will be seen to operate as follows:

With engine 42 running, pump 44 draws hydraulic fluid from reservoir 46 and forces it at high pressure through tube 80, inlet port 62, bypass 70, and out exhaust port 66, to return through tube 82 back to the reservoir. The size of the ports 62 and 66, passage 70 and tubes 80 and 82, are sufficiently large that very little back pressure is developed restricting this flow.

Then, positioned as shown in FIGURE 1, with sole plate 16 sliding lightly on the ground, the device is maneuvered to place the open blades 17 and 20 about a stalk or tree trunk to be cut. Trigger 78 is squeezed, thereby moving valve piston 54 to its rearward position. Hydraulic fluid is then prevented from exhausting through port 66, and instead flows from inlet port 62 through chamber 60 and through outlet port 64, flexible tube 84, cylinder port 38 into chamber 36 of drive cylinder 28. This forces piston 32, and therewith piston rod 30 and lever 32, to actuate and close blade 20 against the stalk or tree, shearing it off. The operation is completed in an instant.

It will be seen that my device as described is self-contained, requiring no external hydraulic or other connections to supply the cutting power. A positive direct force is applied to the cutting blades by the movable cylinder 28.

Also, importantly, the blades 17 and 20 are virtually setting on the ground, permitting foliage, stalks, tree trunks, etc. to be cut at ground level.

The device described in FIGS. 1–5 can be moved from front to rear very readily, and the cutting blades can be jutted into areas to be cut in view of the narrow character thereof. I have also found it desirable in certain instances to position the sole plate and cutting blades crosswise with respect to the direction of the tubular frame 10. This modified cutting assembly is shown in FIGURES 6 and 7. Thus sole plate 100 is fastened to frame 10 perpendicularly thereto. Fixed blade 101 extends forwardly from sole plate 100 adjacent one lateral end thereof. A mating movable blade 102 and lever 103 (which may be forged from one piece) are pivotally connected to the fixed blade about axis 104. The cylinder 105, which operates similarly to cylinder 28, previously described, is interposed between lever 103 and extension 106, affixed to the end of sole plate 100 opposite that on which the blades are fastened.

Where my device is used as a self-contained limb or tree pruning device, I may separate the cutting (blade)

assembly from the pump, motor, etc., which may be slung on the operator's back. Also, I may then employ a stationary blade having a hooked cutting surface extending nearly in a 180° arc, as shown in the cutting assembly of FIGURES 8 and 9. In this embodiment stationary blade 110 affixed to support 111 has a cutting edge 112 extending 180°, making it very useful for hooking about limbs or foliage to be cut. In this embodiment also, the cylinder-piston rod assembly works oppositely to those described above; that is, the piston rod is extended in the normal position, and is pulled into the cylinder upon actuation. Also, instead of being directly connected to the extension lever 113 of movable cutting blade 114 (which is pivotally mounted on the sole blade about axis 115), the piston rod is connected to linkage 116, the latter also being pivotally connected to the sole plate at 117. Connecting linkage 118 pivotally connects linkage 116 and said lever 113 of the movable blade. This type of compound linkage is well-known in the art.

Of course, by appropriate modification the compound linkage can readily be adapted to the other cutting assemblies shown, and vice versa. Other modifications doubtless suggest themselves from the foregoing description of my invention, without departure from the spirit thereof. For example, a four-way valve can be used with a double acting hydraulic cylinder, in place of the three-way valve single-acting cylinder combination specifically described above (the latter being preferred, however, due to fewer tubing connections, and in the interest of compactness). Also, an accumulator, such as a nitrogen accumulator, can be interposed between the discharge side of the pump and the valve inlet, where desirable to store pressurized fluid between cycles. Such equivalents are contemplated, it being understood that I have described my invention in order to illustrate, rather than limit it.

What I claim is:

1. A self-contained pruning device comprising a blade assembly and a power assembly, said blade assembly including a sole plate having a stationary shear blade attached thereto and extending in the plane thereof, a mating shear blade pivotally mounted on such support member, and a hydraulic cylinder-piston means disposed between said support member and said movable blade for opening and closing the latter, said mating blade and cylinder piston means being disposed above the plane of said sole plate, permitting the article to be pruned to be disposed between said blades substantially at ground level when said plate is soled on the ground; said power assembly including an internal combustion engine-driven hydraulic pump, said pump being operatively connected through conduits with said hydraulic cylinder, through a valve for maintaining said blades open when said valve is in one position, while fluid passing through said pump is recycled, and closing said blades when said valve is actuated to a second position, and means for actuating said valve means.

2. The device of claim 1 wherein said sole plate is fixed to the lower end of a frame which terminates at its upper end in a handle, said power assembly being mounted on said frame, with said actuating means being accessible to said handle.

3. A self-contained pruning device comprising a blade assembly and a power assembly, said blade assembly including a sole plate having a stationary shear blade attached thereto and extending in the place thereof, a mating shear blade pivotally mounted on such support member, and a hydraulic cylinder-piston means disposed between said support member and said movable blade for opening and closing the latter, said mating blade and cylinder piston means being disposed on a plane adjacent to the plane of said sole plate, permitting the article to be pruned to be disposed between said blades substantially at ground level when said plate is soled on the ground; said power assembly including an internal combustion engine-driven hydraulic pump, said pump being operatively connected through conduits with said hydraulic pump, said pump being operatively connected through conduits with said hydraluic cylinder, through a valve for maintaining said blades open when said valve is in one position, while fluid passing through said pump is recycled, and closing said blades when said valve is actuated to a second position, and means for actuating said valve means.

References Cited

UNITED STATES PATENTS

| | | | |
|---|---|---|---|
| 391,742 | 10/1888 | Gridley | 30—249 X |
| 2,642,901 | 6/1953 | Hayden | 30—206 X |
| 2,696,042 | 12/1954 | Wallace | 30—180 |
| 2,697,457 | 12/1954 | Lawrence | 30—228 X |
| 2,705,858 | 4/1955 | Marsh | 56—246 X |
| 2,751,943 | 6/1956 | Ford | 30—228 X |
| 2,814,872 | 12/1957 | Gerrans | 30—228 |
| 3,213,605 | 10/1965 | Welden | 30—228 X |

ROBERT C. RIORDON, *Primary Examiner.*

J. C. PETERS, *Assistant Examiner.*